United States Patent
Gassmann et al.

(10) Patent No.: US 7,338,404 B2
(45) Date of Patent: Mar. 4, 2008

(54) DRIVE ASSEMBLY FOR VARIABLE TORQUE DISTRIBUTION

(75) Inventors: Theodor Gassmann, Siegburg (DE); Mark Schmidt, Bonn (DE); Klaus Arndt, Blomberg (DE)

(73) Assignee: GKN Driveline International GmbH (DE)

( * ) Notice: Subject to any disclaimer, the term of this patent is extended or adjusted under 35 U.S.C. 154(b) by 127 days.

(21) Appl. No.: 11/320,132

(22) Filed: Dec. 28, 2005

(65) Prior Publication Data

US 2006/0172846 A1    Aug. 3, 2006

(30) Foreign Application Priority Data

Jan. 28, 2005    (DE) .................. 10 2005 004 291

(51) Int. Cl.
*F16H 48/20*    (2006.01)

(52) U.S. Cl. ............... 475/231; 475/19; 475/205; 475/221

(58) Field of Classification Search .......... 475/18, 475/19, 151
See application file for complete search history.

(56) References Cited

U.S. PATENT DOCUMENTS

| | | |
|---|---|---|
| 4,986,800 A | 1/1991 | Meffert et al. |
| 5,370,588 A | 12/1994 | Sawase et al. |
| 5,497,845 A | 3/1996 | Shibahata |
| 5,904,634 A | 5/1999 | Teraoka |
| 5,910,064 A * | 6/1999 | Kuroki .................. 475/199 |
| 5,951,430 A * | 9/1999 | Kobayashi ............... 475/221 |
| 6,033,337 A * | 3/2000 | Ohkuma et al. ............ 477/1 |
| 6,056,660 A | 5/2000 | Mimura |
| 6,120,407 A * | 9/2000 | Mimura ................. 475/225 |
| 7,086,982 B2 * | 8/2006 | Bowen .................. 475/225 |
| 7,204,778 B1 * | 4/2007 | Mimura ................. 475/225 |
| 2006/0172845 A1 * | 8/2006 | Gassmann et al. ........ 475/205 |

FOREIGN PATENT DOCUMENTS

DE    39 41 719 A1    6/1991

* cited by examiner

Primary Examiner—David D. Le

(57) ABSTRACT

A drive assembly (1) includes a differential (3) with a differential carrier (7) and two output shafts (19) connected to the differential carrier (7) via a differential gear set (10). The assembly includes at least one transmission stage (25) with a first sun gear (26) connected to the differential carrier (7), and a second sun gear (28) connected to one of the two output shafts (19), and at least one parallel planetary gear (27) which engages the sun gears (26, 28) and which is rotatably held in a carrier element (32) which can be coupled to a stationary housing (18). The two sun gears have profile-displaced teeth with different numbers of teeth and are arranged at the same axial distance (C) from the at least one planetary gear (27). The planetary gear (27) has two toothed portions (29, 30) with corresponding teeth.

28 Claims, 10 Drawing Sheets

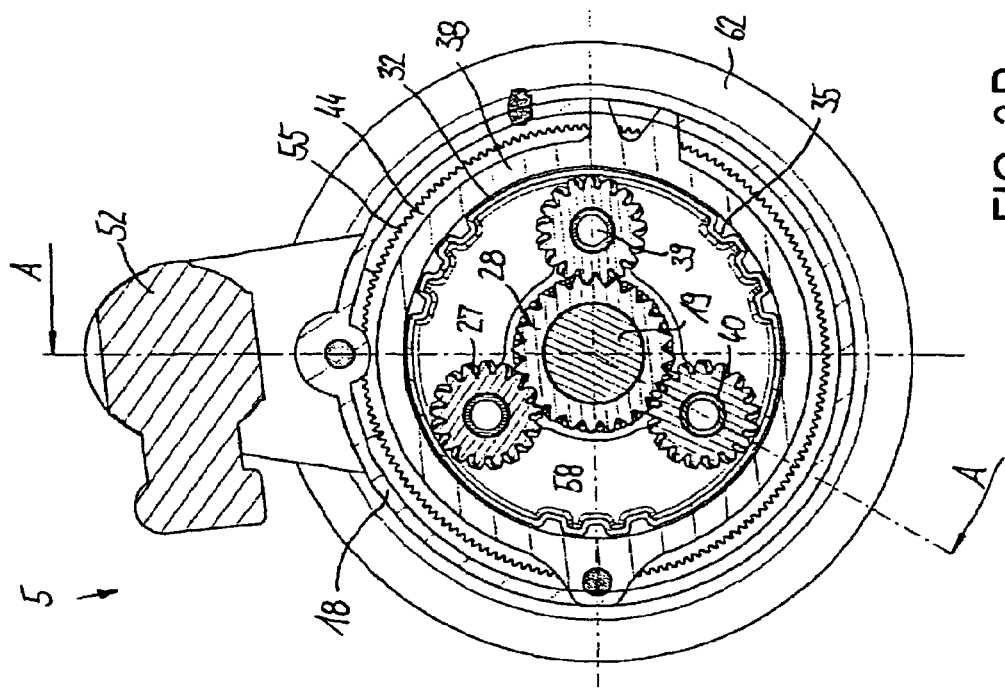
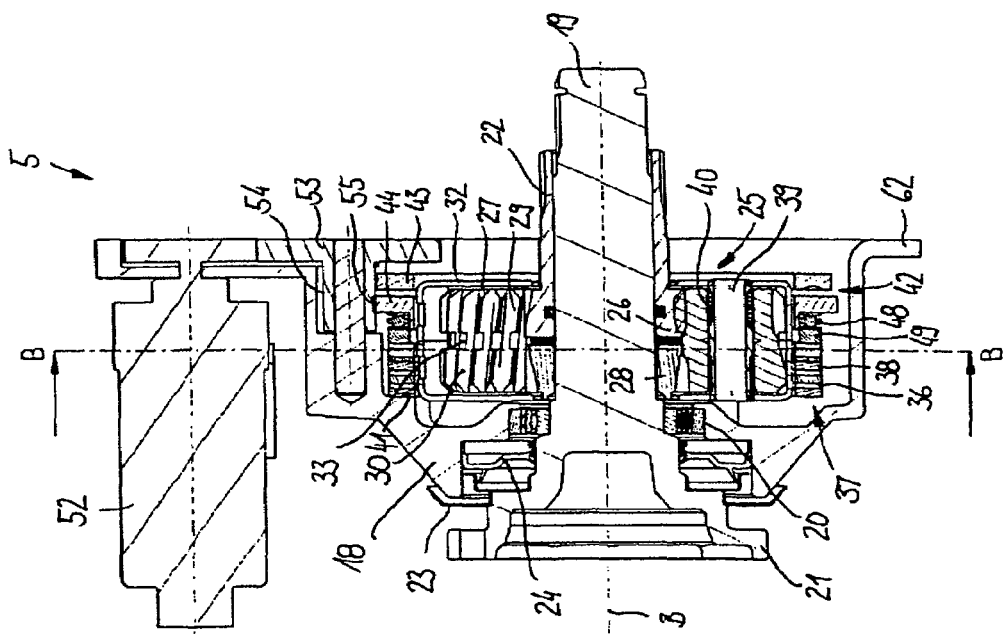
FIG. 3A
FIG. 3B

DRIVE ASSEMBLY FOR VARIABLE TORQUE DISTRIBUTION

TECHNICAL FIELD

The invention relates to a transmission stage, more particularly for a drive assembly to achieve a variable torque distribution in the driveline of a motor vehicle.

BACKGROUND OF THE INVENTION

Drive assemblies for variable torque distribution normally include a differential with one input shaft and two output shafts which have a compensating effect relative to one another. The drive assembly for the variable transmission of torque functions in that, prior to being distributed to the two output shafts, part of the torque introduced via the input shaft is branched off the differential carrier. The branched-off percentage of torque is additionally introduced into one of the two output shafts following the branching-off point for the remaining torque. For this purpose, there is provided a transmission stage and a coupling per output shaft. The transmission stage includes an input gear which is driven by the differential carrier and which accelerates or decelerates an output gear. By coupling the output gear to the associated output shaft of the differential, the associated output shaft is accelerated or decelerated. In this way, it is possible, if required, for a greater amount of torque to be transmitted to the one of the two output shafts than to the other one of the output shafts in order to increase the driving stability of the motor vehicle. Such drive assemblies can be used for distributing torque between the two sideshafts of an axle differential or for the controlled distribution of torque between the two axle shafts of a central differential of a motor vehicle driven by several axles.

U.S. Pat. No. 6,056,660 describes a transmission stage for a drive assembly to achieve a variable torque distribution between two sideshafts of a driven axle. The transmission stage is provided in the form of an epicyclic transmission and comprises a plurality of planetary gears which are rotatably supported in a carrier element rotating in the differential housing. The planetary gears are connected in a rotationally fast way by means of a first toothed portion to the differential carrier and, by means of a sun gear, they are drivingly connected to the sideshaft. Per sideshaft, there is provided a multi-plate coupling which serves to brake a rotational movement of the respective carrier element relative to the differential housing. In this way, an additional torque is applied to the respective sideshaft.

U.S. Pat. No. 5,497,845 proposes a transmission stage for a drive assembly to permit a variable torque distribution between two sideshafts of a driven axle. This transmission stage is provided in the form of a stationary transmission and includes a layshaft which is rotatably supported in the transmission housing and comprises a plurality of toothed portions. One of the toothed portions is drivingly connected to the differential carrier, whereas another toothed portion is drivingly connected to a plate carrier element of a multi-plate coupling. The transmission ratio of the two toothed portions is such that the plate carrier element of the multi-plate coupling rotates faster than the associated sideshaft. Thus, by actuating the multi-plate coupling, an increased torque can be transmitted to the sideshaft.

U.S. Pat. No. 4,986,800 describes a four-wheel locking system for a motor vehicle. It includes a planetary drive with a plurality of planetary gears which engage an input sun gear and an output sun gear with different numbers of teeth. The speed change between the two sun gears is achieved by a profile displacement of the sets of teeth.

These assemblies are complex and present assembly difficulties. It would be desirable to provide simply designed, easy-to-produce drive assembly to achieve a variable distribution of torque.

SUMMARY OF THE INVENTION

In accordance with a first embodiment of the invention, a drive assembly for variable distribution of torque in a driveline of a motor vehicle is provided. The drive assembly includes a differential with a differential carrier and two output shafts which are drivingly connected to the differential carrier via a differential gear set and which, relative to one another, have a compensating effect. At least one transmission stage is also included with a first sun gear which is drivingly connected to the differential carrier, with a second sun gear which is arranged so as to coaxially adjoin the first sun gear and which is drivingly connected to one of the two output shafts, and with at least one parallel planetary gear whose teeth engage the teeth of the first sun gear and the second sun gear and which is rotatably held in a carrier element rotating around the axis of rotation. The carrier element can be coupled to a stationary housing. The first sun gear and the second sun gear, relative to one another, comprise profile-displaced teeth with different numbers of teeth and are arranged at the same axial distance from the at least one planetary gear. The planetary gear comprises two toothed portions whose teeth correspond to one another.

A second embodiment provides a drive assembly for variable transmission of torque in a driveline of a motor vehicle, including a differential with a differential carrier and two output shafts which are drivingly connected to the differential carrier via a differential gear set and which, relative to one another, have a compensating effect. At least one transmission stage is also included with a first sun gear which is drivingly connected to the differential carrier, with a second sun gear which is arranged so as to coaxially adjoin the first sun gear and which can be coupled to one of the two output shafts, and with at least one parallel planetary gear whose teeth engage the teeth of the first sun gear and the second sun gear and which is rotatably held on a stationary shaft. The first sun gear and the second sun gear, relative to one another, comprise profile-displaced teeth with different numbers of teeth and are arranged at the same axial distance from the at least one planetary gear. The planetary gear comprises two toothed portions whose teeth correspond to one another.

A third embodiment provides a drive assembly for variable distribution of torque in a driveline of a motor vehicle, having a differential with a differential carrier and two output shafts which are drivingly connected to the differential carrier via a differential gear set and which, relative to one another, have a compensating effect. At least one transmission stage is also provided with a first sun gear which can be coupled to the differential carrier, with a second sun gear which is arranged so as to coaxially adjoin the first sun gear and which is drivingly connected to one of the two output shafts, and with at least one parallel planetary gear whose teeth engage the teeth of the first sun gear and those of the second sun gear and which is rotatably supported on a stationary shaft. The first sun gear and the second sun gear, relative to one another, comprise profile-displaced teeth with different numbers of teeth and are arranged at the same axial distance from the at least one planetary gear. The planetary gear comprises two toothed portions whose teeth correspond to one another.

All three inventive embodiments are advantageous in that they allow a simple and thus cost-effective production and assembly. The planetary gear which engages the first and the second sun gear can be produced in one piece, so that the number of parts required for the transmission stage is small. Furthermore, the continuous toothing of the planetary gear ensures a high degree of accuracy of the engagement with the gearwheels. The transmission ratio between the first sun gear and the second sun gear is achieved by the profile displacement of the two sets of teeth relative to one another. The two sun gears and the at least one planetary gear have the same modulus. The inventive transmission stage can be used as an epicyclic transmission, i.e. as a drive assembly wherein the planetary gears rotate around the axis of rotation, or as a stationary transmission wherein the planetary gears are supported on the stationary shaft.

According to a further embodiment, the numbers of teeth of the first and of the second sun gear are such that a ratio of 0.8 to 1.2 is generated between the first and the second sun gear. In this way, it is possible to transmit an additional or reduced torque of ±20% to the respective output shaft. The numbers of teeth of the first and second sun gears can be such that in one rotational position of the first and second sun gears relative to one another, several teeth of the first and second sun gears axially overlap so that they are able to engage simultaneously the teeth of the planetary gear. In another embodiment, a plurality of planetary gears are provided which are uniformly circumferentially distributed around the first and the second sun gear and engage same simultaneously.

In order to achieve an advantageous NVH (noise vibration harshness) behavior, the sun gears and the planetary gears are provided in the form of helical gears which can be designed in such a way that, when the motor vehicle drives forward, the axial forces acting on the first and the second sun gear due to the engaging teeth of the planetary gear, are directed towards each other. Thus, the axial forces of the two gearwheels are substantially eliminated, so that a receiving part for the planetary gear remains unaffected by the forces. According to one embodiment, the at least one planetary gear can comprise a continuous groove between the two toothed portions. According to another embodiment, the two toothed portions can adjoin one another seamlessly. It is further advantageous if the planetary gear is produced in one piece and comprises continuously extending teeth.

When using the transmission stage as a epicyclic transmission, the at least one planetary gear is rotatably held in a carrier element which can be coupled to a stationary transmission housing by a coupling in order to make it possible for an increased torque to be transmitted to the associated output shaft. According to one embodiment, the carrier element comprises two basket-type parts each having a base and a casing which can be produced as formed part out of plate metal. A simple assembly procedure is achieved if the carrier element, the at least one planetary gear and the two gearwheels form parts of a pre-assembled unit. The first sun gear can be produced so as to be integral with a hollow shaft which is rotatably supported, such as by a friction bearing, on the output shaft. The second sun gear is connected to the output shaft in a rotationally fast way. An outer circumferential face of the carrier element can be provided with an engaging mechanism for engaging inner plates of the coupling in a rotationally fast way. This feature, too, contributes towards a simple design of the transmission stage.

The inventive drive assembly can be used as an axle differential of a motor vehicle driven by one or more axles in order to make it possible for an increased torque to be transmitted to a sideshaft connected to the driving wheels. In addition or alternatively, the inventive drive assembly can also be used as a central differential of a motor vehicle driven by a plurality of axles in order to be able to apply an increased amount of torque to one of the axle shafts for driving the front or rear wheels.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE DRAWINGS

Figure 1:
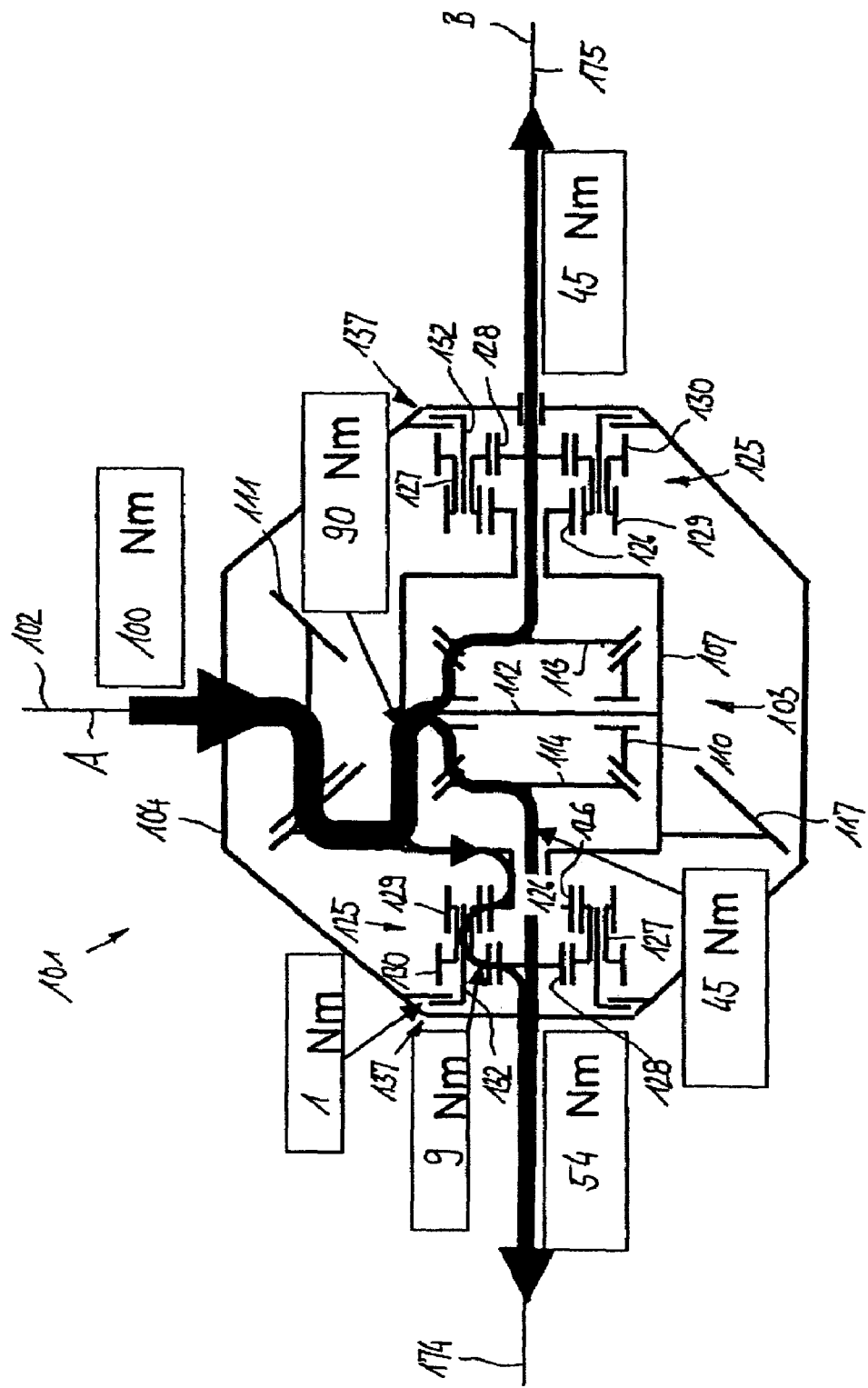
FIG. 1 is a diagrammatic illustration of a drive assembly according to the state of the art with an exemplary torque distribution.

FIG. 1 is a diagrammatic illustration of a drive assembly 101 permitting a variable distribution of torque to the driveline of a motor vehicle, such as it is known from the state of the art. The drive assembly 101 is driven by a multi-step reduction gear (not shown) via a driveshaft 102, and the incoming torque is distributed to two sideshafts 174, 175. The drive assembly comprises a differential drive 103 and a differential carrier 107 which is rotatably supported in a stationary differential housing 104 around the axis of rotation B. A crown gear 117 which engages a bevel gear 111 connected to the driveshaft 102 and which is driven thereby is connected to the differential carrier 107. In the differential carrier 107, a plurality of differential gears 110 are rotatably supported on journals 112 positioned perpendicularly relative to the axis of rotation B. The teeth of the differential gears 110 engage teeth of two sideshaft gears 113, 114 which serve to transmit torque to the sideshafts.

Two transmission stages 125 for variably distributing torque to the sideshafts 174, 175 are arranged so as to laterally adjoin the differential drive 103. As these are identical in design, only one will be described below by way of example. Each transmissions stage 125 comprises a first sun gear 126 connected in a rotationally fast way to the differential carrier 107, a plurality of planetary gears 127 whose teeth engage those of the first sun gear 126, as well as a second sun gear 128 which engages the planetary gears 127 and which is connected in a rotationally fast way to the respective sideshaft 174, 175. The planetary gears 127 each comprise two toothed portions 129, 130 one of which engages the first sun gear 127, and the other one engages the second sun gear 128. In order to achieve a speed change, the two sun gears 126, 128 comprise different numbers of teeth, and the two toothed portions 129, 130 of the planetary gears 127 also comprise different numbers of teeth. The planetary gears 127 are rotatably received in a carrier element 132 which, jointly with the planetary gears 127, is able to rotate around the axis of rotation B. The carrier element is coupled via a coupling 137 to the housing 104 to be able to transmit an increased torque to the associated sideshaft 174, 175.

The following describes, by way of example, the torque flow through the drive assembly 101. A torque of 100 Nm is introduced from the driveshaft 102 via the crown gear 117 into the differential carrier 107. Under normal driving conditions, i.e. when the carrier elements 132 rotate freely, the incoming torque is uniformly distributed to the two sideshaft gears 113, 114 at a ratio of 50:50. However, if the actual driving dynamics require that a greater torque be transmitted to one of the two wheels, the respective transmission stage 125 is activated. In the present case, a greater amount of torque is transmitted to the lefthand sideshaft 174. For this purpose, the lefthand coupling 137 is activated, i.e. the carrier element 132 which previously rotated freely around the axis of rotation is braked relative to the differential housing 104. A percentage of torque is thus branched off the differential carrier 107, which percentage of torque is transmitted via the sun gear 126 and via the planetary gears 127 to the lefthand sideshaft 174. In the present case, the percentage of torque branched off the differential carrier 107 amounts to 10 Nm, so that a torque of only 90 Nm is available for the differential gears 110. The torque introduced via the differential gears 110 is uniformly distributed to the two sideshaft gears 113, 114, i.e. each sideshaft receives 45 Nm. The torque value of 10 Nm branched off the differential carrier 107 is added to the torque allocated to the lefthand sideshaft 174. Due to heat losses in the coupling 137, a torque of approximately 1 Nm is lost, so that the amount of torque added to the lefthand sideshaft is 9 Nm, i.e. a total amount of torque of 54 Nm is transmitted to the lefthand sideshaft 174. Thus, overall, the ratio is 54 Nm to 45 Nm between the lefthand wheel on the outside of the curve and the righthand wheel on the inside of the curve.

Figure 2:
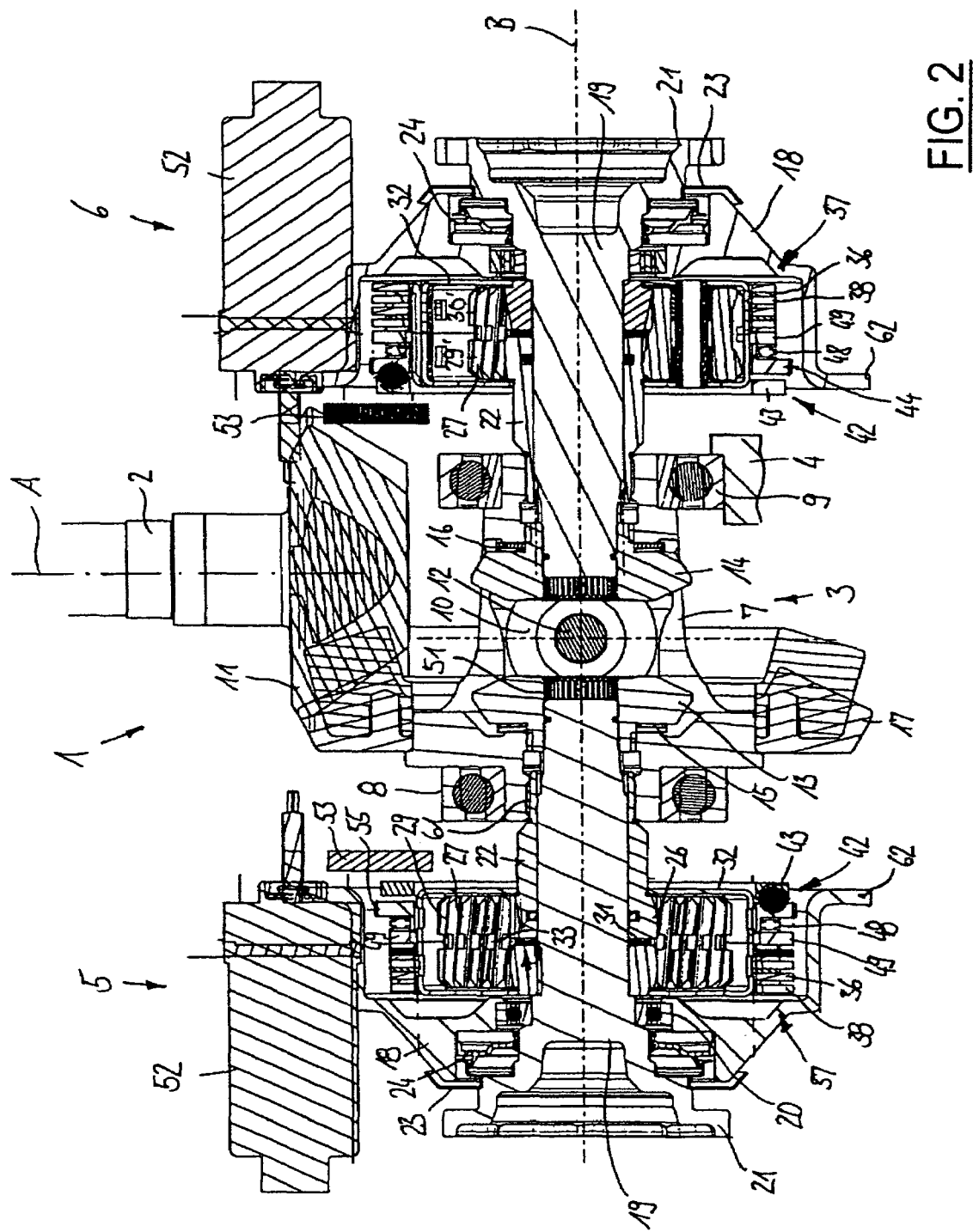
FIG. 2 is a longitudinal section through a first embodiment of an inventive drive assembly with rotating transmission stages.

FIGS. 2 to 6 will be described jointly below. FIG. 2 shows an inventive drive assembly 1 with a differential drive 3 in a differential housing 4 (partially shown only) and two drive modules 5, 6 with a transmission stage 25 each. Apart from the characteristics in accordance with the invention, the functioning mode of the drive assembly 1 largely corresponds to that shown in FIG. 1, so that, to that extent, reference is hereby made to the description of same. The reference numbers of identical components have been reduced by 100. The drive modules 5, 6 have been provided in the form of separate units and serve to variably distribute the torque to the two sideshafts.

The differential drive 3 comprises a differential carrier 7 and a crown gear 17 which is connected thereto in a rotationally fast way and which engages a bevel gear 11 connected to the driveshaft 2 and is driven by said bevel gear 11. The driveshaft 2 is supported by a rolling contact bearing (not shown) in the differential housing 4 so as to be rotatable around the longitudinal axis A. The differential carrier 7 comprises two sleeve-shaped projections by which it is supported in the differential housing 4 by means of rolling contact bearings 8, 9 so as to be rotatable around the axis of rotation B. In the differential carrier 7, a plurality of differential gears 10 are rotatably supported on journals 12 which are positioned perpendicularly relative to the axis of rotation B and which rotate in the differential carrier 7. Two sideshaft gears 13, 14 which serve to transmit torque to the drive modules 5, 6 and to the associated output shafts 19 respectively engage the differential gears 10. The sideshaft gears 13, 14 are rotatably supported in the differential carrier 7 on the axis of rotation B, and there are provided abutment discs 15, 16 for the purpose of supporting, relative to the differential housing 4, the axial expansion forces generated by the transmission of torque from the differential gears 10 to the sideshaft gears 13, 14.

Figure 3C:
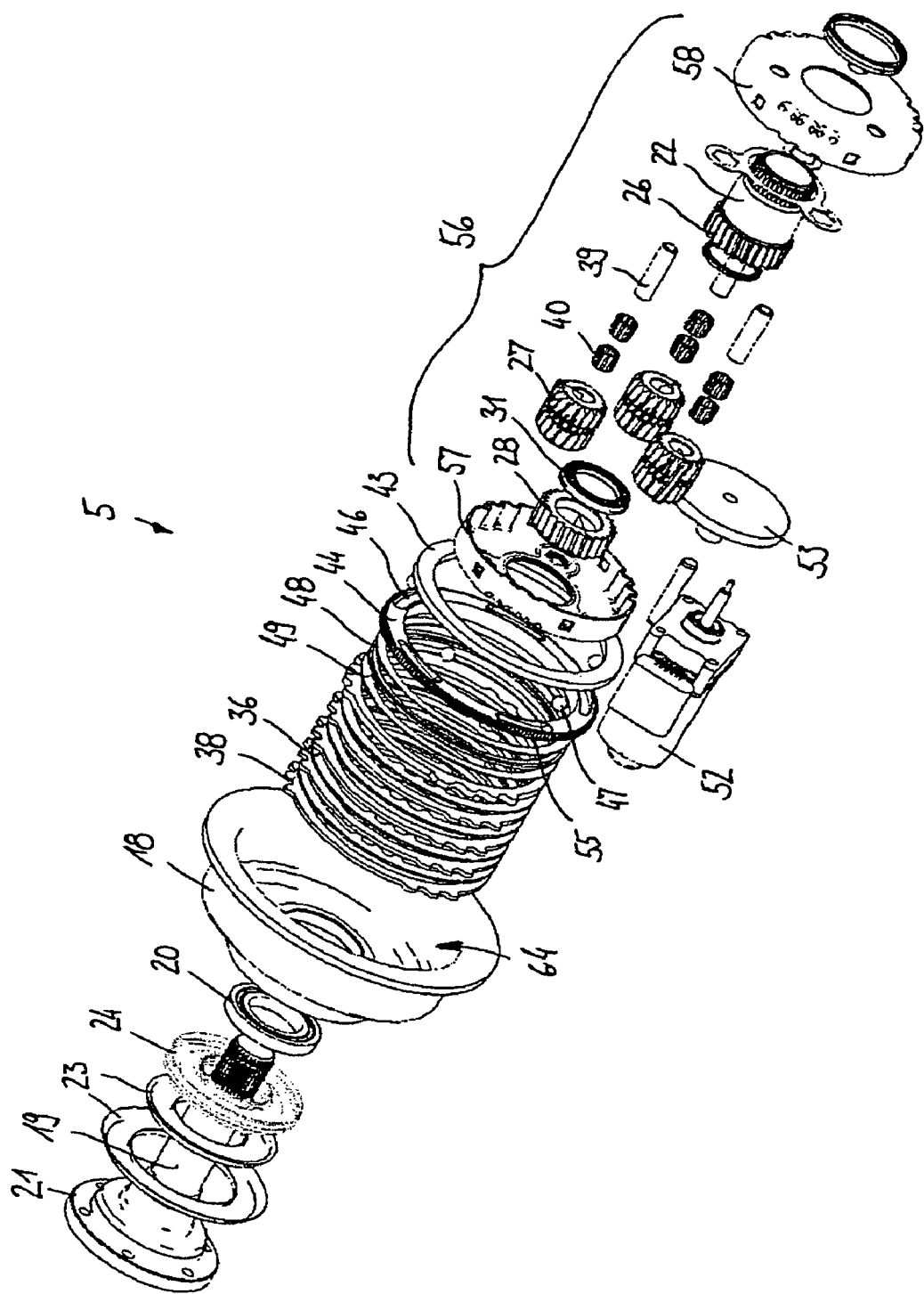
FIG. 3 shows one of the drive modules of FIG. 2 with a rotating transmission stage
A) in a longitudinal section,
B) in a cross section,
C) in a perpective view in the form of an exploded illustration.

The two drive modules 5, 6 are arranged about mirror-symmetrically relative to the central plane of the differential drive 3 demarcated by the journal axes. As the two drive modules 5, 6 are identical in respect of design and functioning, only one will be described below by way of example. It is shown in the form of a detail in FIGS. 3A, 3B and 3C. FIG. 3A is a longitudinal section along line A-A of FIG. 3B. FIG. 3B is a cross-sectional view taken along line B-B of FIG. 3A. FIG. 3C is perspective illustration in an exploded view.

Each of the modules 5, 6 comprises a housing 18, an output shaft 19 connected in a rotationally fast way via longitudinal teeth to the associated sideshaft gear 13 of the differential drive 3, a hollow shaft 22 coaxially supported on said output shaft 19 and connected in a rotationally fast way to the differential carrier 7 via longitudinal teeth, a transmission stage 25 connected between the output shaft 19 and the hollow shaft 22, as well as a coupling 37 for coupling a carrier element 32 of the transmission stage 25 to the housing. The output shaft 19, at its end facing away from the differential drive 3, comprises a flange 21 to be connected to an associated sideshaft (not illustrated) of the motor vehicle. The first shaft 19 is rotatably supported relative to the housing 18 by a rolling contact bearing 20 and sealed by a contact-free sealing cap 23 and by a contacting sealing ring 24. Towards the differential drive 3, the housing 18 comprises attaching mechanism 62 in the form of a flange which surrounds an aperture 64. For assembly purposes, the unit shown is bolted with the flange 62 to the differential housing 4. The hollow shaft 22 is slidingly supported relative to the output shaft 19 and sealed by a sealing ring 61 (FIG. 4).

Figure 4:
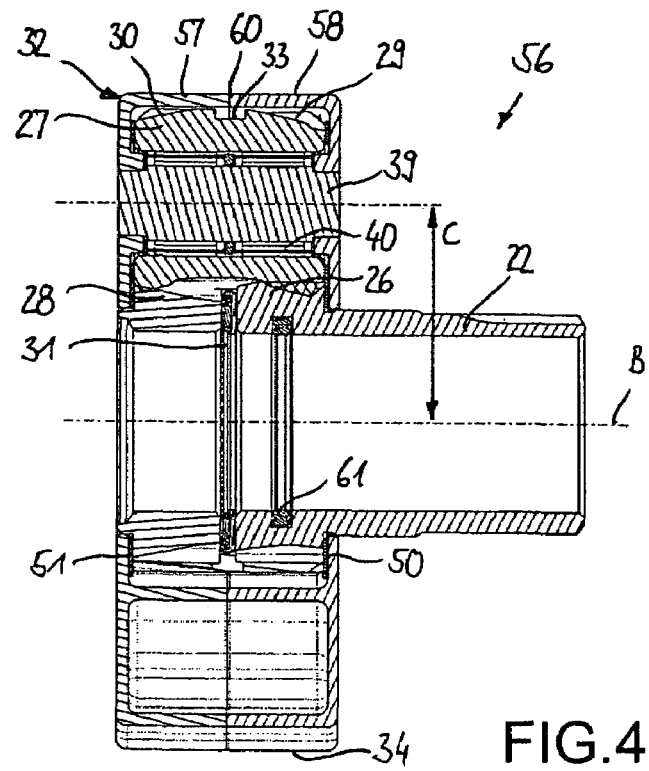
FIG. 4 shows the transmission stage according to FIG. 3 in a first variant in a longitudinal section.

The transmission stage 25 shown in detail in FIG. 4 comprises a first sun gear 26, a plurality of planetary gears 27 engaging the first sun gear 26 and rotatably supported in the carrier element 32, as well as a second sun gear 28 engaging the planetary gears 27. The first sun gear 26 is produced so as to be integral with the hollow shaft 22, whereas the second sun gear 28 is connected to the output shaft 19 in a rotationally fast way. The planetary gears 27 are each produced in one piece and comprise two toothed portions 29, 30 with identical teeth, with the one toothed portion engaging the first sun gear 26 and the other one the second sun gear 28.

In order to achieve a change in speed between the first output shaft 19 and the second hollow shaft 22 coaxially supported thereon, the two sun gears 26, 28 comprise different numbers of teeth, with the numbers of teeth of the sun gears 26, 28 being such that a speed difference of up to 20% is achieved between the output shaft 19 and the hollow shaft 22. In one example, the number of teeth of the first and second sun gear 26, 28 are such that a transmission ratio of 0.8 to 1.2 is generated. Furthermore, the numbers of teeth of the first and of the second sun gear 26, 28 have been selected to be such that, in one rotational position, several teeth of the first and of the second sun gear 26, 28 axially overlap one another. In each of the regions of overlap formed in this way, there is arranged a planetary gear 27 whose teeth engage those of the two sun gears 26, 28. For example, the first sun gear 26 can comprise thirty teeth, whereas the second sun gear 26 comprises twenty-seven teeth. In consequence, across the circumference of the two sun gears 26, 28, there are formed three regions of overlap in which individual teeth of the two sets of teeth are axially aligned relative to one another, so that they are able to engage joint counter teeth. Each of said three regions of overlap is associated with a planetary gear 27, so that, overall, three planetary gears 27 are uniformly circumferentially distributed around the first and the second sun gear 26, 28 and simultaneously engage same. The first and second sun gears 26, 28 and the planetary gear 27 have helical teeth.

The two sun gears 26, 28 are each arranged at the same axial distance C from the planetary gears 27. The change in speed is achieved by the profile displacement of the teeth of the two sun gears 26, 28 relative to one another, with the sun gears 26, 28 and the planetary gears 27 having the same modulus. The fact that the planetary gears 27 comprise two toothed portions 29, 30 with corresponding teeth results in a small number of parts for the transmission stage 25, which simplifies production and assembly. In addition, the continuous arrangement of the teeth of the planetary gears 27 results in a high degree of accuracy of the tooth engagement between the planetary gears 27 and the sun gears 26, 28. The teeth are provided in the form of helical teeth in order to achieve an advantageous NVH (noise vibration harshness) behavior with the helical teeth being designed in such a way that the axial forces acting during the transmission of torque to the sun gears 26, 28 are directed towards each other. Between the two sun gears 26, 28, there is provided an axial bearing 31 which ensures that the two sun gears 26, 28 are axially supported relative to one another. As the diameter of the axial bearing 31 is greater than the root diameter of the sun gears 26, 28, the planetary gears 27, in the axial region of overlap with the axial bearing 31, comprise continuous grooves between the two toothed portions 29, 30.

Referring again to FIGS. 3A-3C, the carrier element 32 together with the planetary gears 27 is coupled by the coupling 37 to the housing 18 to branch off an additional torque directly at the differential carrier 7 and transmit same via the hollow shaft 22 and the transmission stage 25 to the output shaft 19. The coupling 37 is provided in the form of a multi-plate coupling and, in addition to the inner plates 36, comprises outer plates 38 which alternate with said inner plates 36 and which are held in a rotationally fast way relative to the housing 18. The plate package of outer plates 38 and inner plates 36 is axially supported against the housing 18 on a supporting face 41 and is actuated by an axial setting device 42.

The axial setting device 42 is provided in the form of a ball ramp assembly and comprises two discs 43, 44 which are rotatable relative to one another and which comprise pairs of ball grooves 45, 46 which are provided for receiving balls 47 and whose depth varies in the circumferential direction. One of the two discs is provided in the form of a supporting disc 43 which is axially supported relative to the housing 18. The other one of the two discs is provided in the form of a setting disc 44 which can be rotated relative to the supporting disc 43 and is axially displaceable in order to load the plate package with an axial force via an axial bearing 48 and a pressure plate 49. The coupling 37 is thus closed so that the carrier element 32 is braked relative to the housing 18.

The ball ramp assembly 42 is controlled by an electric motor 52 via a pinion shaft 53 rotatably supported in the housing 18. The pinion shaft 53 comprises teeth 54 which engage counter teeth 55 at the setting disc 44. The electric motor is controlled by an electronic control device (not illustrated) which serves to regulate the driving dynamics of the motor vehicle.

Figure 5:
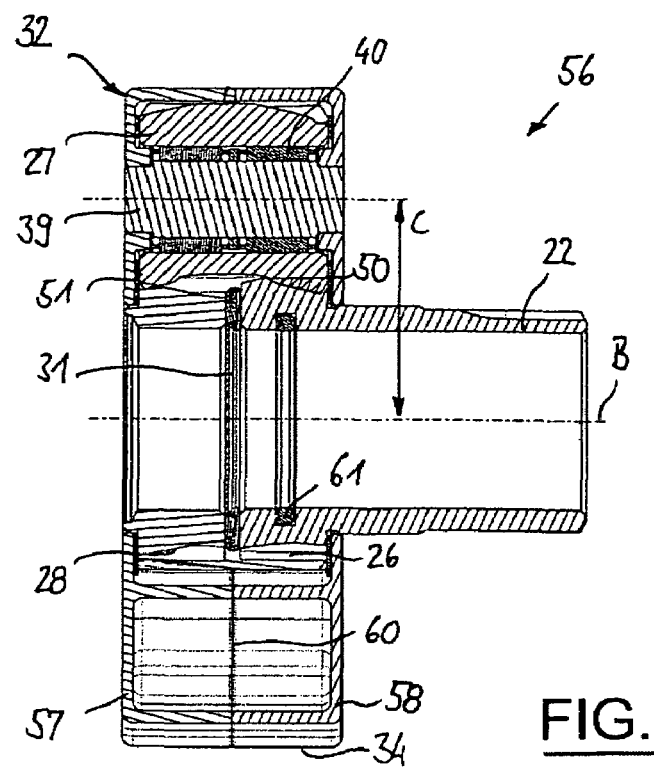
FIG. 5 shows a second variant of a transmission stage in a longitudinal section.
Figure 6:
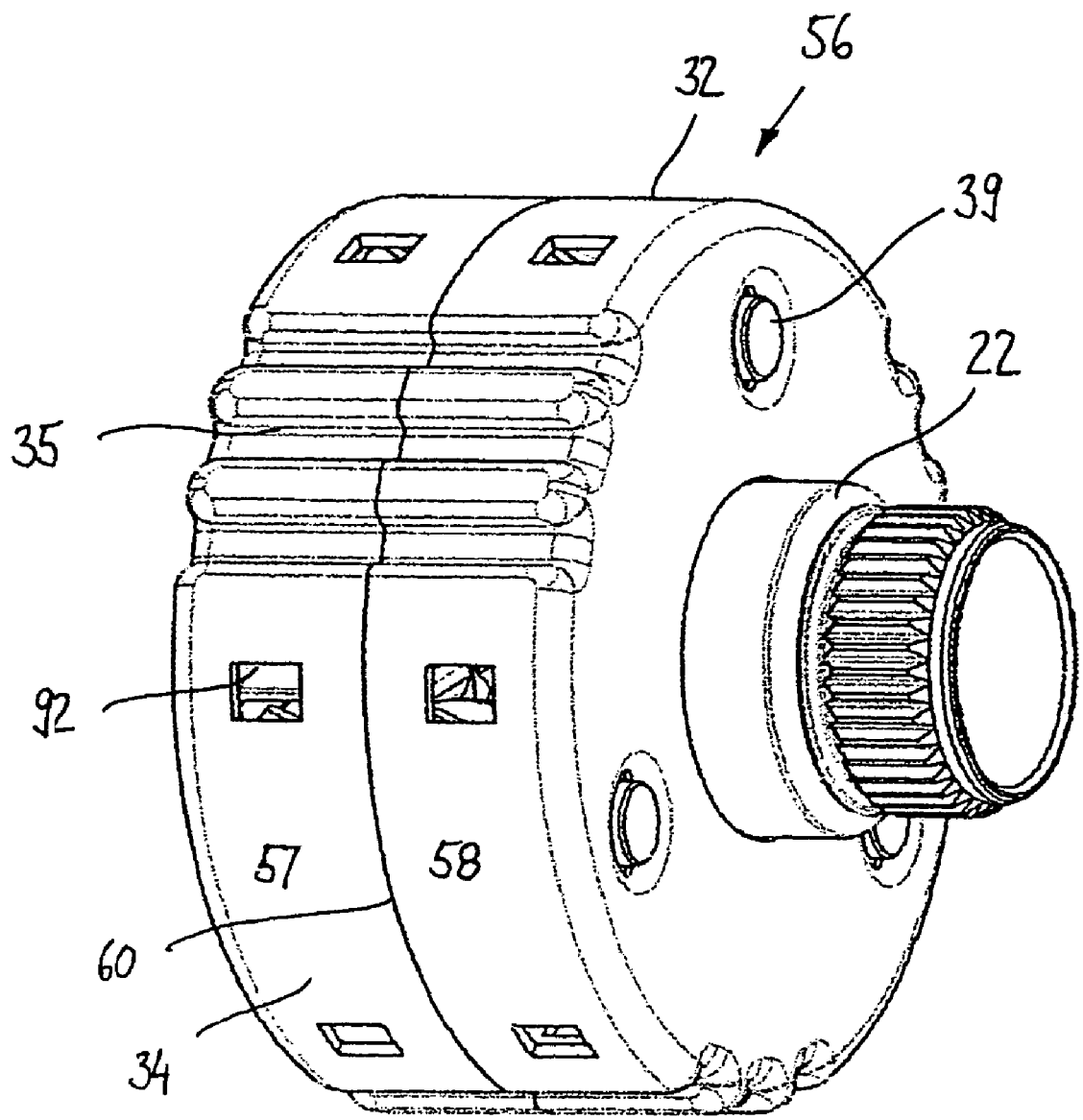
FIG. 6 shows the transmission stage according to FIG. 4 or 5 in a perspective view.

As shown in FIGS. 4 to 6, the planetary gears 27 are rotatably received on journals 39 in the carrier element 32 by needle bearings 40. The carrier element 32 is basket-shaped and is largely closed towards the outside. The carrier element 32 is produced from two cup-shaped parts 57, 58 formed from plate metal which, after the planetary gears 27 and the sun gears 26, 28 have been inserted, are connected to one another, such as by welding. The carrier element 32 and the planetary gears 27, the sun gears 26, 28 as well as the hollow shaft 22 form a pre-assembled unit 56 which is simply slipped on to the output shaft 19. It can be seen that, at its outer circumferential face 34, the carrier element 32 comprises engaging mechanism 35 which, for torque transmitting purposes, can be engaged by the inner plates 36 of a coupling 37. The two cup-shaped carrier parts 57, 58 each comprise axial bores 59 into which the journals 39 are inserted and on which the planetary gears 27 are supported by needle bearings. Furthermore, it is possible to see a continuous weld 60 which connects the two carrier parts 57, 58 to one another. To allow a lubricant to enter the carrier element 32, the outer circumferential face 34 is provided with radial apertures 92 through which lubricant can reach the interior of the carrier element 32, coming from the interior of the housing 18. In the carrier element 32, there are provided radial, friction-reducing abutment discs 50, 51 which axially support the planetary gears 27 and the sun gears 26, 28.

FIG. 5 shows a variant of the transmission stage 25. As far as design and functioning is concerned, it corresponds to the transmission stage 25 according to FIG. 4, and to that extent, reference is hereby made to the description of same. Identical components have been given the same reference numbers. The present embodiment is characterised in that the toothed portions 29, 30 adjoin one another seamlessly, i.e. the planetary gears 27 comprise a continuous set of teeth. This is particularly advantageous because an additional production stage can be eliminated. Because of the continuous teeth, the planetary gears 27 can be produced cost-effectively.

Figure 7:
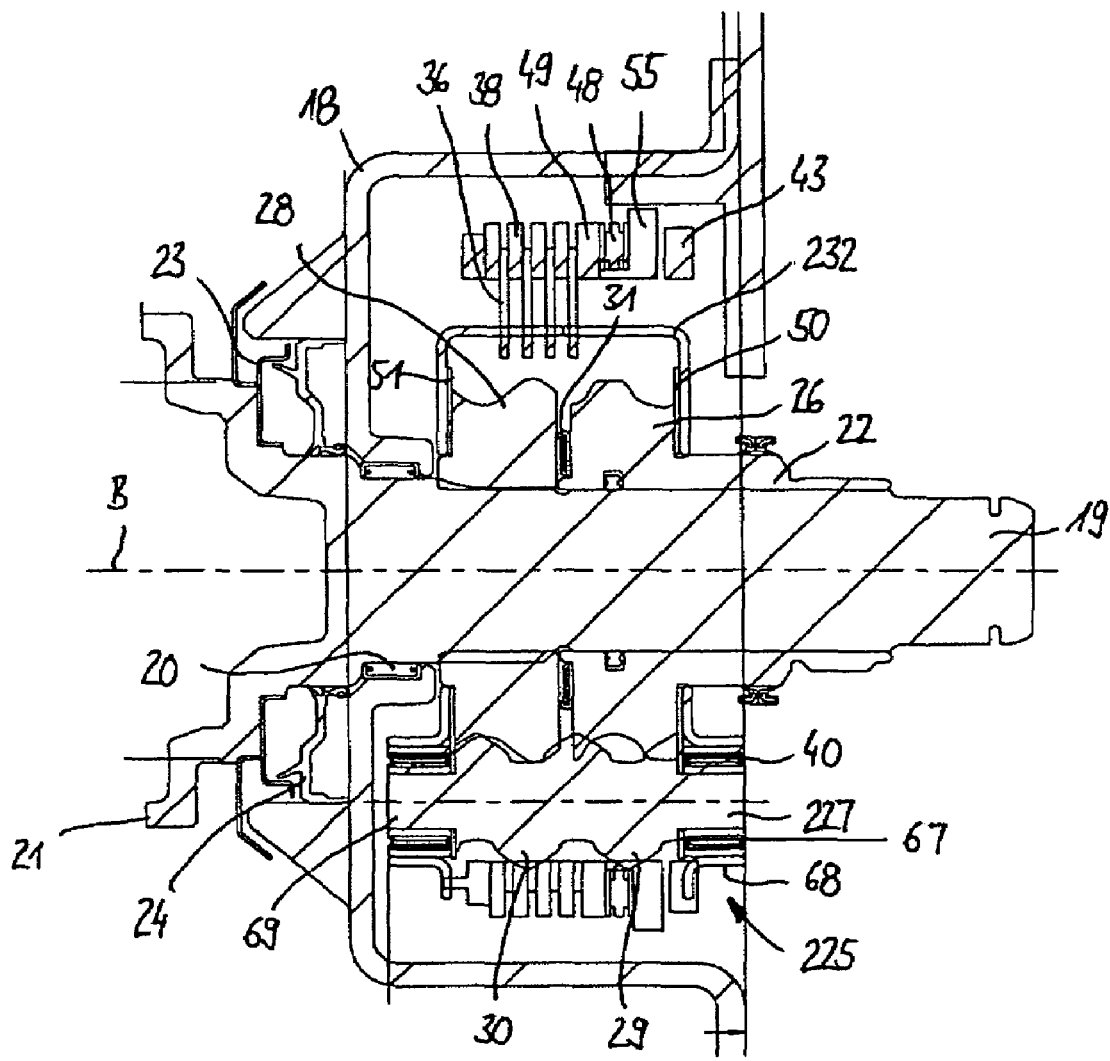
FIG. 7 shows a third variant of a transmission stage in a longitudinal section.
Figure 8:
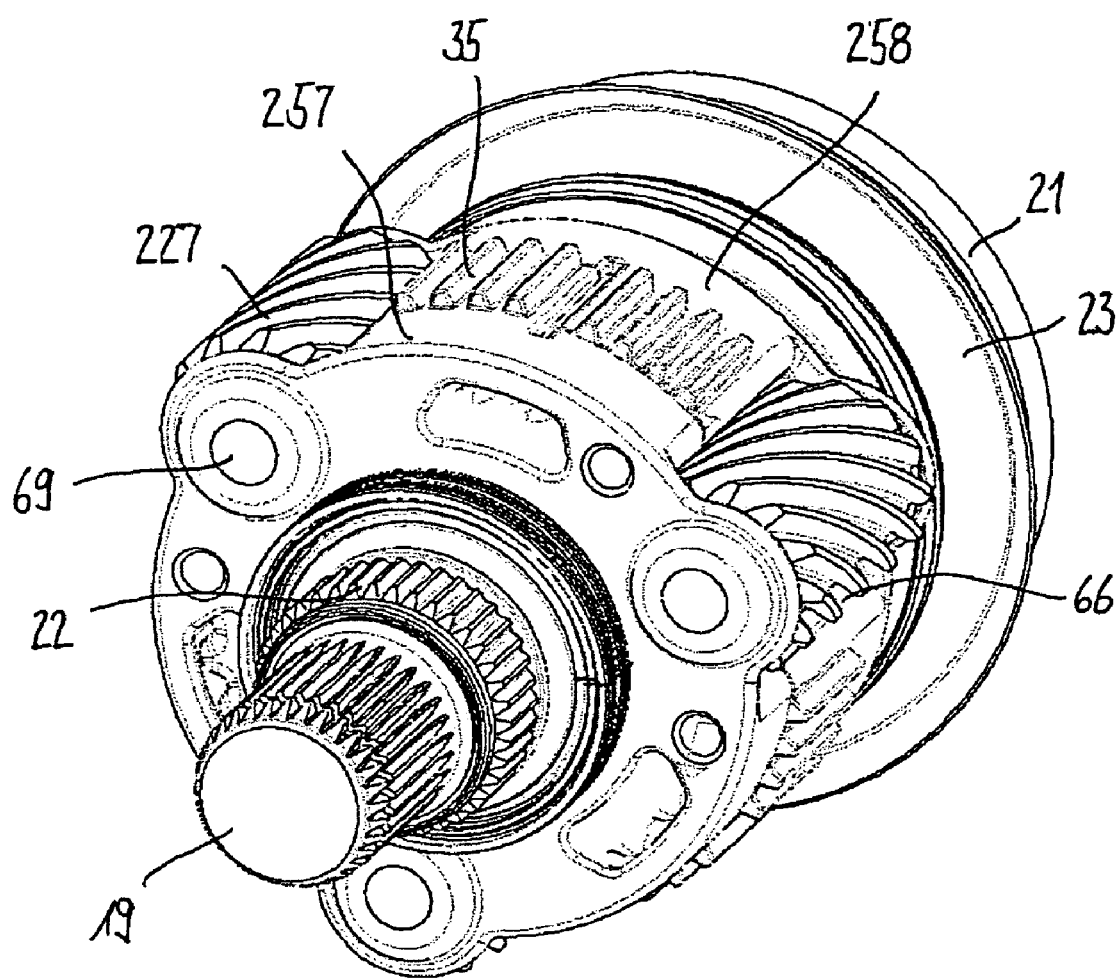
FIG. 8 shows the transmission stage according to FIG. 7 in a perspective view.

As far as design and functioning are concerned, the variant according to FIGS. 7 and 8 which will be described jointly below also corresponds to that shown in FIG. 4 and to that extent, reference is made to the description of same. The reference numbers of components which have been modified have been indexed by 200. The present transmission stage 225 is characterised by the carrier element 232, as a whole, having a smaller diameter and, in its outer circumferential face, apertures 66 are provided through which the planetary gears 227 pass radially outwardly. For supporting the planetary gears 227, the carrier element 232 is provided with radial projections 67 at which there are provided sleeve-shaped attachments 68 for receiving a bearing 40. The planetary gears 227 are solid and produced in one piece and comprise journals 69 which extend in opposite directions and which are received in the bearings 40. As in the case of the previous embodiment, the present carrier element 232 is made of two basket-type parts 257, 258. The present embodiment is advantageous in that the complete unit comprises a smaller diameter. The engaging mechanism 235 for receiving, in a rotationally fast way, the inner plates are arranged inside the greatest outer diameter of the planetary gears 227.

Figure 9:
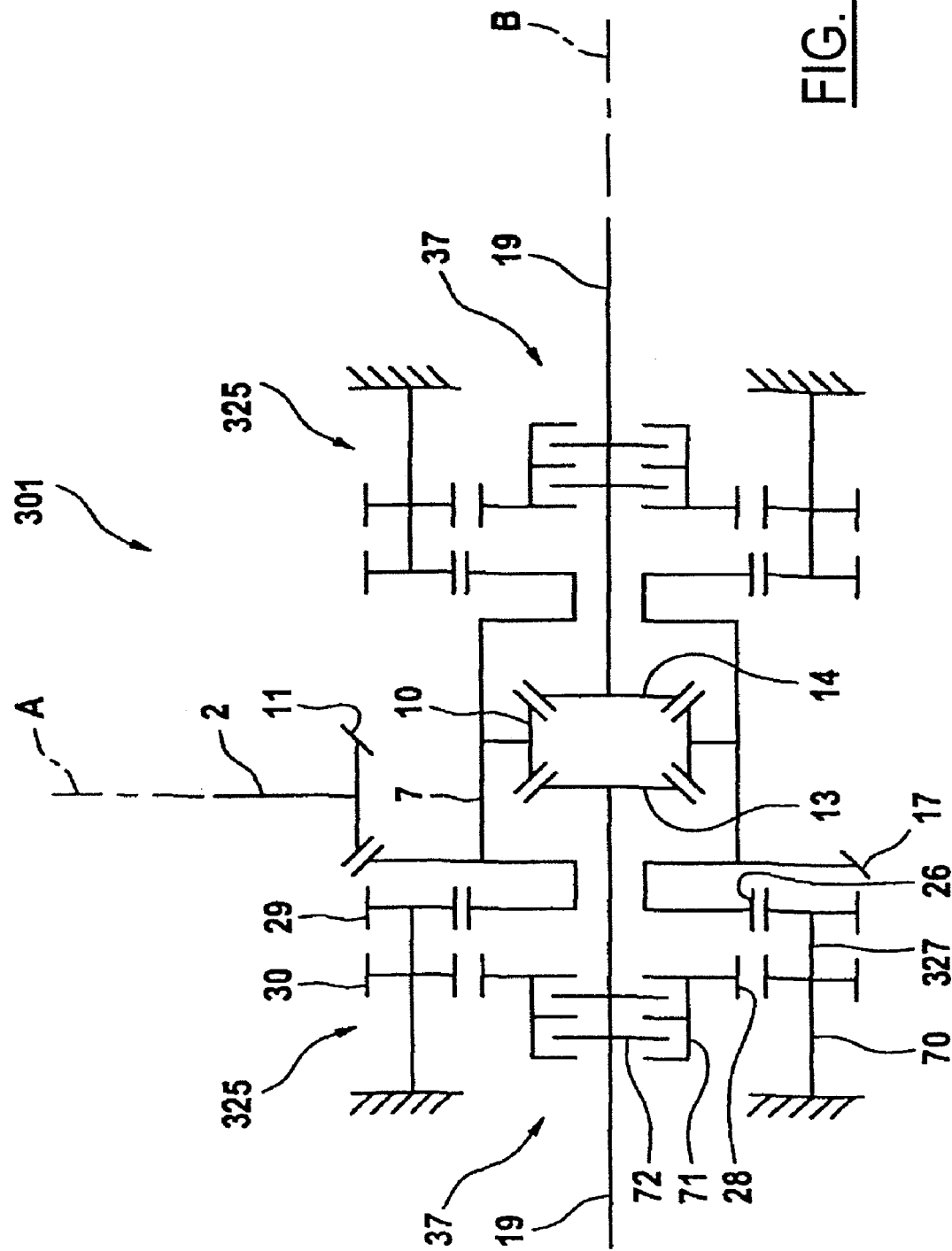
FIG. 9 shows a schematic illustration of a second embodiment of an inventive drive assembly with stationary transmission stages.

FIG. 9 schematically illustrates a second embodiment of an inventive drive assembly 301 for achieving a variable torque distribution. As far as design and functioning are concerned, it largely corresponds to that shown in FIG. 2 and to that extent, reference is made to the description of same. Identical components have therefore been given the same reference numbers. The reference numbers of modified components have been indexed by 300. In contrast to the previous embodiment, the two transmission stages 325 have been provided in the form of stationary transmissions, i.e. the associated planetary gears 327 are rotatably supported on stationary shafts 70. As the transmission stages 325 are identical in design, only one will be described below. The first sun gear 26 is connected in a rotationally fast way to the differential carrier 7 and the second sun gear 28 can be coupled via the coupling 37 to the output shaft 19. An outer plate carrier 71 of the coupling 37 is connected in a rotationally fast way to the second sun gear 28, whereas an inner plate carrier 72 of the coupling 37 is connected in a rotationally fast way to the output shaft 19. The planetary gears 327 whose teeth engage those of the first sun gear 26 and of the second sun gear 28 correspond to those shown in FIGS. 4 and 5 respectively. In this case, too, the planetary gears 327 comprise a continuous set of teeth, i.e. two toothed portions 29, 30 with corresponding teeth; the two sun gears 26, 28 comprise different numbers of teeth whose profiles are displaced relative to one another and are arranged at identical axial distances from the planetary gears. The change in speed is achieved by the profile displacement of the two sun gears 26, 28 relative to one another. The numbers of teeth of the sun gears 26, 28 are such that a change to a higher speed is achieved, i.e. the outer plate carrier 71 of the coupling 37 rotates faster than the output shaft 19. By closing the coupling 37, an increased amount of torque can thus be transmitted to the respective output shaft 19.

Figure 10:
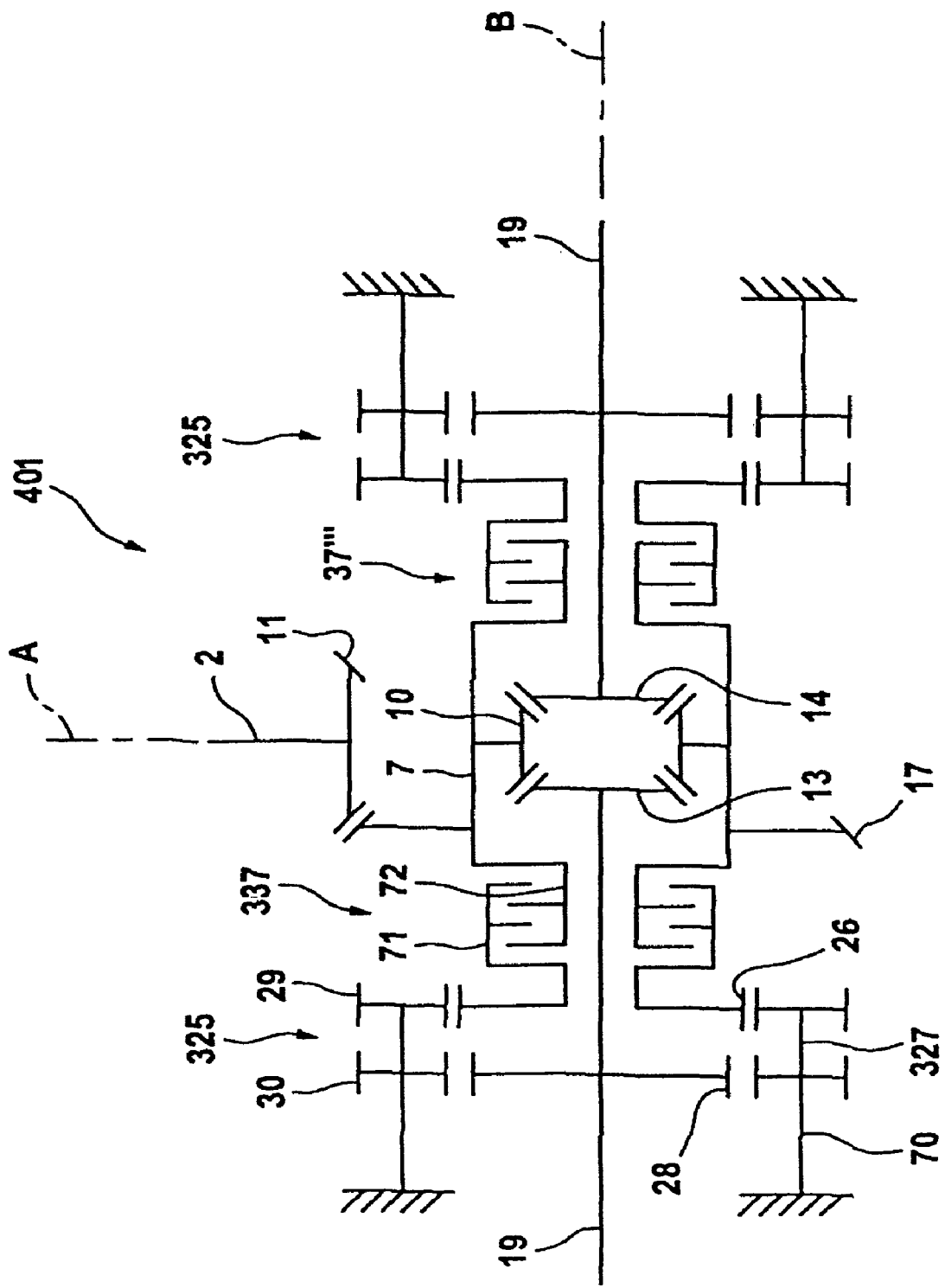
FIG. 10 shows a schematic illustration of a third embodiment of an inventive drive assembly with stationary transmission stages.

FIG. 10 schematically illustrates a third embodiment of an inventive drive assembly 401 for the variable distribution of torque. In respect of design and functioning it largely corresponds to that shown in FIG. 9 and, to that extent, reference is made to the description of same. Identical components have therefore been given the same reference numbers. In contrast to the embodiment according to FIG. 9, the couplings 337 of the present embodiment are connected between the differential carrier 7 and the transmission stages 325. An inner plate carrier 72 of the coupling 337 is connected in a rotationally fast way to the differential carrier 7, whereas the outer plate carrier 71 is connected in a rotationally fast way to the first sun gear 26. The two transmission stages 325 are provided in the form of stationary transmissions, i.e. the associated planetary gears 327 are rotatably supported on stationary shafts 70. The first sun gear 26 can be coupled via the coupling 337 to the differential carrier 7, whereas the second sun gear 28 is drivingly connected to the output shaft. The planetary gears 327 engaging the first sun gear 26 and the second sun gear 28 correspond to the embodiment shown in FIGS. 4 and 5 respectively. In this case, too, the planetary gears 327 comprise a continuous set of teeth, i.e. two toothed portions 29, 30 with corresponding teeth. The two sun gears 26, 28 which comprise identical axial distances from the planetary gears comprise different numbers of teeth whose profiles are displaced relative to one another. The change in speed is achieved by the profile displacement of the two sun gears 26, 28 relative to one another. The numbers of teeth of the sun gears 26, 28 are such that a change to higher speeds takes place, i.e. the outer plate carrier 71 of the coupling 337 rotates faster than the output shaft 19. By closing the coupling 337, the respective output shaft 19 is thus able to transmit an increased amount of torque.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A drive assembly for variable torque distribution in a driveline of a motor vehicle, comprising:
   a differential with a differential carrier and two output shafts which are drivingly connected to the differential carrier via a differential gear set and which, relative to one another, have a compensating effect;
   at least one transmission stage with a first sun gear drivingly connected to the differential carrier, a second sun gear which is arranged to coaxially adjoin the first sun gear and which is drivingly connected to one of the two output shafts, and at least one parallel planetary gear whose teeth engage teeth of the first sun gear and the second sun gear and which is rotatably held in a carrier element rotating around an axis of rotation (B), wherein the carrier element can be coupled to a stationary housing;
   wherein the first sun gear and the second sun gear, relative to one another, comprise profile-displaced teeth with different numbers of teeth and are arranged at the same axial distance (C) from the at least one planetary gear;
   wherein the planetary gear comprises two toothed portions whose teeth correspond to one another.

2. A drive assembly according to claim 1, wherein the numbers of teeth of the first and the second sun gear are such that a transmission ratio of 0.8 to 1.2 is generated between the first and the second sun gear.

3. A drive assembly according to claim 1, wherein the numbers of teeth of the first and of the second sun gear are such that, in a rotational position of the first and the second sun gear relative to one another, several teeth axially overlap one another, so that, at the same time, they are able to engage the teeth of the at least one planetary gear.

4. A drive assembly according to claim 1, comprising a plurality of planetary gears uniformly circumferentially distributed around the first and the second sun gear and engaging same simultaneously.

5. A drive assembly according to claim 1, wherein the at least one planetary gear comprises a continuous groove between the two toothed portions.

6. A drive assembly according to claim 1, wherein the two toothed portions adjoin one another seamlessly.

7. A drive assembly according to claim 1, wherein the first sun gear is integral with a hollow shaft which is rotatably supported on the output shaft.

8. A drive assembly according to claim 1, wherein the carrier element comprises an engaging mechanism on an outer circumferential face to engage inner plates of a coupling.

9. A drive assembly according to claim 1, wherein the first sun gear, the second sun gear and the at least one planetary gear comprise helical teeth.

10. A drive assembly according to claim 9, wherein the helical teeth are designed in such a way that the axial forces acting on the first and the second sun gear as a result of the engaging teeth are directed towards each other.

11. A drive assembly for variable torque distribution in a driveline of a motor vehicle, comprising:
a differential with a differential carrier and two output shafts which are drivingly connected to the differential carrier via a differential gear set and which, relative to one another, have a compensating effect;
at least one transmission stage with a first sun gear drivingly connected to the differential carrier, a second sun gear which is arranged to coaxially adjoin the first sun gear and which can be coupled to one of the two output shafts, and at least one parallel planetary gear whose teeth engage teeth of the first sun gear and the second sun gear and which is rotatably held on a stationary shaft;
wherein the first sun gear and the second sun gear, relative to one another, comprise profile-displaced teeth with different numbers of teeth and are arranged at the same axial distance from the at least one planetary gear;
wherein the planetary gear comprises two toothed portions whose teeth correspond to one another.

12. A drive assembly according to claim 11, wherein the numbers of teeth of the first and the second sun gear are such that a transmission ratio of 0.8 to 1.2 is generated between the first and the second sun gear.

13. A drive assembly according to claim 11, wherein the numbers of teeth of the first and of the second sun gear are such that, in a rotational position of the first and the second sun gear relative to one another, several teeth axially overlap one another, so that, at the same time, they are able to engage the teeth of the at least one planetary gear.

14. A drive assembly according to claim 11, comprising a plurality of planetary gears uniformly circumferentially distributed around the first and the second sun gear and engaging same simultaneously.

15. A drive assembly according to claim 11, wherein the at least one planetary gear comprises a continuous groove between the two toothed portions.

16. A drive assembly according to claim 11, wherein the two toothed portions adjoin one another seamlessly.

17. A drive assembly according to claim 11, wherein the first sun gear is integral with a hollow shaft which is rotatably supported on the output shaft.

18. A drive assembly according to claim 11, wherein the first sun gear, the second sun gear and the at least one planetary gear comprise helical teeth.

19. A drive assembly according to claim 18, wherein the helical teeth are designed in such a way that the axial forces acting on the first and the second sun gear as a result of the engaging teeth are directed towards each other.

20. A drive assembly for variable torque distribution in a driveline of a motor vehicle, comprising:
a differential with a differential carrier and two output shafts which are drivingly connected to the differential carrier via a differential gear set and which, relative to one another, have a compensating effect;
at least one transmission stage with a first sun gear which can be coupled to the differential carrier, a second sun gear which is arranged to coaxially adjoin the first sun gear and which is drivingly connected to one of the two output shafts, and at least one parallel planetary gear whose teeth engage teeth of the first sun gear and the second sun gear and which is rotatably supported on a stationary shaft;
wherein the first sun gear and the second sun gear, relative to one another, comprise profile-displaced teeth with different numbers of teeth and are arranged at the same axial distance from the at least one planetary gear;
wherein the planetary gear comprises two toothed portions whose teeth correspond to one another.

21. A drive assembly according to claim 20, wherein the numbers of teeth of the first and the second sun gear are such that a transmission ratio of 0.8 to 1.2 is generated between the first and the second sun gear.

22. A drive assembly according to claim 20, wherein the numbers of teeth of the first and of the second sun gear are such that, in a rotational position of the first and the second sun gear relative to one another, several teeth axially overlap one another, so that, at the same time, they are able to engage the teeth of the at least one planetary gear.

23. A drive assembly according to claim 20, comprising a plurality of planetary gears uniformly circumferentially distributed around the first and the second sun gear and engaging same simultaneously.

24. A drive assembly according to claim 20, wherein the at least one planetary gear comprises a continuous groove between the two toothed portions.

25. A drive assembly according to claim 20, wherein the two toothed portions adjoin one another seamlessly.

26. A drive assembly according to claim 20, wherein the first sun gear is integral with a hollow shaft which is rotatably supported on the output shaft.

27. A drive assembly according to claim 20, wherein the first sun gear, the second sun gear and the at least one planetary gear comprise helical teeth.

28. A drive assembly according to claim 27, wherein the helical teeth are designed in such a way that the axial forces acting on the first and the second sun gear as a result of the engaging teeth are directed towards each other.

* * * * *